May 12, 1959  H. HORN  2,886,627
PLUG ARRANGEMENT FOR COAXIAL CABLES
Filed Jan. 10, 1955  2 Sheets-Sheet 1

INVENTOR.
Heinz Horn
BY Michael S. Striker
Attorney

May 12, 1959  H. HORN  2,886,627
PLUG ARRANGEMENT FOR COAXIAL CABLES
Filed Jan. 10, 1955  2 Sheets-Sheet 2
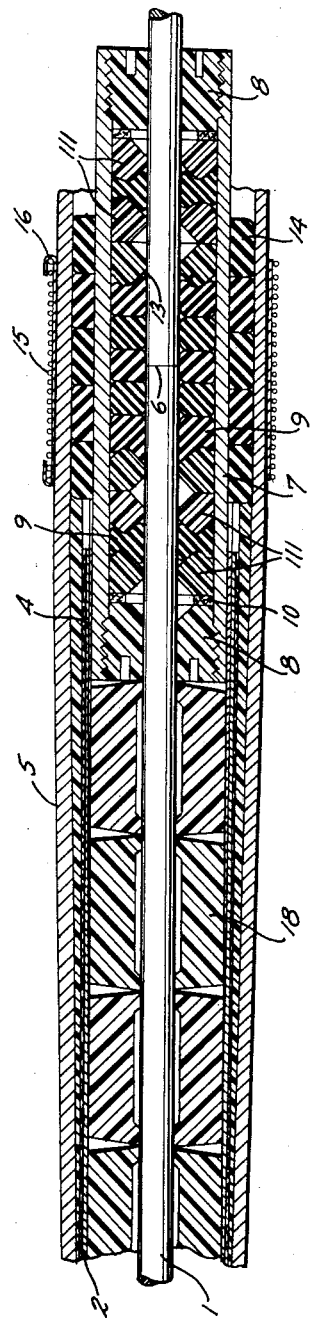
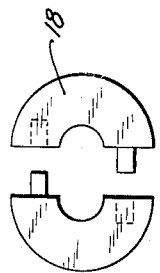
INVENTOR.
Heinz Horn
BY
Michael S. Striker
Attorney

United States Patent Office 2,886,627
Patented May 12, 1959

---

2,886,627

PLUG ARRANGEMENT FOR COAXIAL CABLES

Heinz Horn, Koln-Mulheim, Germany, assignor to Firma Norddeutsche Seekabelwerke Aktiengesellschaft, Nordenham, Germany Application January 10, 1955, Serial No. 480,902

Claims priority, application Germany January 12, 1954

5 Claims. (Cl. 174—22)

The present invention relates to coaxial cables.

More particularly, the present invention relates to plug arrangements for coaxial cables which are located in bodies of water.

Conventional cables of this type are made in sections which must be joined to each other, and at the joints between the cable sections it is customary to provide fluid-tight plug arrangement designed to prevent fluids such as water from flowing along the interior of the cable whose parts are insulated from each other by air spaces within the cable. In other words, if part of the cable should become injured and water should get into the interior thereof, this water will flow only up to the plug arrangements of the particular cable section which has developed the leak, the plug arrangements preventing the water from flowing along the entire length of the cable. In this way most of the cable remains undamaged, and it is only necessary to repair that section of the cable which has developed a leak.

Known plug arrangements of the above type do not accomplish their desired ends in actual practice. The reason for this is that such plug arrangements are made up usually of outer tubes of copper or the like in which a sealing material is compressed. When, as a result of an increase in temperature, for example, the sealing material expands, it stretches and deforms the outer copper tube because the rate of expansion of the sealing material is greater than that of the tube. Very often the tube is expanded beyond its elastic limit and is permanently deformed. When, after such a permanent deformation has occurred, the sealing material contracts to its original volume when the temperature drops, free spaces remain between the sealing material and the permanently deformed outer tube, and water can then flow through these free spaces from one cable section to the next cable section and thus the plug arrangement does not provide the seal which is desired.

The present invention takes advantage of the fact that with changes in temperature the change in pressure of the sealing material in the copper tube or the like depends not only on the thermal coefficient of expansion of the sealing material, but also to a great extent on the relationship between the thermal coefficient of expansion of the sealing material and the compressibility of the sealing material. Thus, if a highly compressible sealing material is used, that is, a sealing material which is easily compressed, then the pressure resulting from an increase in temperature, for example, may still be prevented from rising to an undesirable extent.

It is accordingly an object of the present invention to provide for a coaxial cable a plug arrangement which is capable of absorbing increases in temperature or the like without causing permanent deformation of a tube which surrounds expandable and contractable sealing members.

A further object of the present invention is to provide a plug arrangement which maintains within a tube having compressible sealing members therein a means for allowing these sealing members to expand without expanding the tube.

Another object of the present invention is to provide a plug arrangement of this type which is easy to assemble.

An additional object of the present invention is to provide for use with a plug arrangement of the above type spacer members which may be easily placed within the coaxial cable.

With the above objects in view the present invention mainly consists of a fluid-tight plug arrangement for coaxial cables, this plug arrangement including an inner, elongated conductor portion and an outer, tubular conductor portion surrounding and spaced from the inner conductor portion and being substantially coaxial therewith. A plurality of plastic, deformable plug members are arranged about the inner conductor portion in the space between the same and the outer conductor portion. A compressing means compresses these plug members and urges the same against the conductor portions, and the space between the conductor portions is only partially filled by these plug members. A substance of greater compressibility than the plug members fills the portion of the space between said conductor portions which is not occupied by the plug members, so that this substance decreases in volume when the plug members increase in volume. A plurality of soft rubber rings are arranged beside each other about the outer conductor portion at the exterior thereof, and a lead sheath portion surrounds these rubber rings. A pressing means presses the lead sheath portion inwardly toward the rubber rings to compress the latter while leaving at least part of the space between the sheath portion and outer conductor portion free, so that the rubber rings may expand into this free space.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 3 is a central, sectional view through one of the sealing members of Fig. 2;

Fig. 4 is an exploded, side elevational view of a space of the present invention, the components of the spacer being shown separated from each other in Fig. 4; and Fig. 5 is a fragmentary view corresponding to Fig. 1 of a different embodiment of the present invention.

Figure 1:
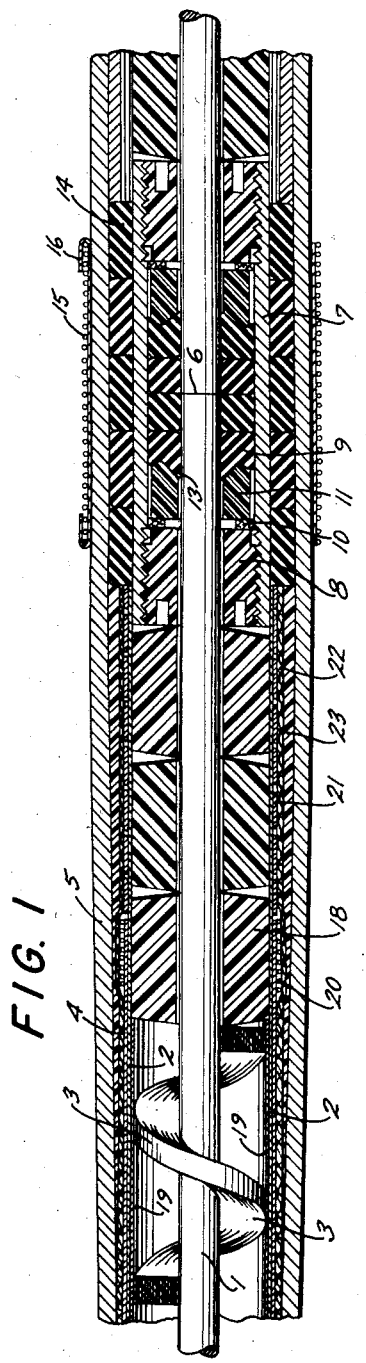
Fig. 1 is a fragmentary, longitudinal central section of a coaxial cable including a plug arrangement constructed in accordance with the present invention.

Referring now to the drawings, the cable shown in Fig. 1 includes an inner conductor 1 surrounded by an outer tubular conductor 2, these conductors being maintained in spaced relation with respect to each other by a spiral spacer band 3 made of laminations of a rigid, electrically non-conductive material, such as polystyrol. The spacer band 3 is surrounded by a tubular covering layer 19 which also may be made of polystyrol. The outer conductor 2 is closely surrounded by a steel band 4 which is wound tightly about the outer conductor 2 and protects the same against pressure. The end of the steel band 4 is held together by a copper wire 20 which is wound tightly about the right end of steel band 4, as viewed in Fig. 1. To the right of the wire 20, as viewed in Fig. 1, a copper band 21 is wound about the outer conductor 2 in order to maintain the cable at the same diameter as that to the left of the winding 20, as viewed in Fig. 1. In other words, the band 21 has the same thickness as the band 4. For this purpose, the band 21 can have its convolutions spaced from and out of contact with each other. A band 22, of a textile material, for example, is wound about the entire structure described above, for insulation purposes, and a further layer 23, made of polystyrol bands, for example, is located about the layer 22, the lead sheath 5 being located over the entire cable. Windings which are located at the exterior of the lead sheath 5 are not shown in the drawings and are of no interest since they form no part of the present invention.

Figure 2:
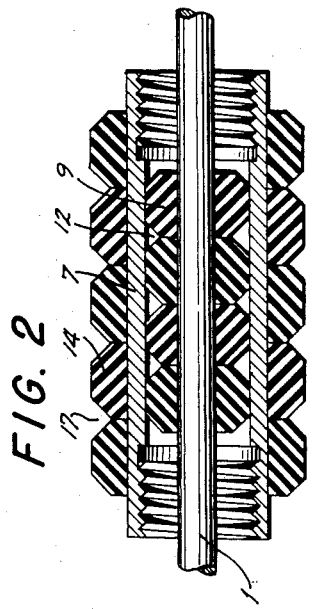
Fig. 2 is a fragmentary, central sectional view of the sealing members of the plug arrangement before these members are compressed.

Fig. 1 shows a pair of inner conductor portions 1 which are joined to each other in end to end relation at 6, and it is at this region that the plug arrangement of the present invention is located. This plug arrangement includes an electrically conductive cylindrical tube 7 which forms the outer conductor portion at the connection between the cable sections. A pair of compression rings 8 through which the conductor portions 1 respectively pass are in threaded engagement with the inner surface of the tube 7, these compression rings 8 being made of an electrically non-conductive substantially rigid material. These rings 8 respectively engage washers 10 which in turn respectively engage rings 11, as shown in Fig. 1, and between the rings 11 there are located in side by side relation a plurality of plastic, deformable plug members in the form of soft rubber rings 9 which have in their unstressed condition the shape shown in Figs. 2 and 3. The elements 8, 10, and 11 form a means for compressing the rings 9 against the inner and outer conductor portions, as shown in Fig. 1, the compression of the rings 9 being obtained by turning the rings 8 into the tube 7. The elements 8 and 11 may be made of any substantially rigid, electrically non-conductive material, such as, for example, polystyrol. The washers 10 may be made of an electrically non-conductive synthetic fibrous material.

It will be noted that when the rings 9 are compressed to the position shown in Fig. 1, there remains in the space between the inner and outer conductor portions free spaces 12 (Fig. 2) and 13 (Fig. 1). In other words, the space between the conductor portions is not completely filled with the rings 9 when the latter are compressed. The spaces 12 and 13 since they are simply filled with the air or other gas located between the inner and outer conductor portions are made of a substantance which has a greater compressibility than the rings 9. As a result when, due to an increase in temperature, for example, the rings 9 expand, they will only decrease the volume of spaces 12 and 13 and will not permanently deform the tube 7, so that in this way the plug arrangement of the invention cannot have permanent gaps through which water may flow from one cable section to the next.

The tube 7 may be made of copper and is connected electrically with the outer conductors 2. The outer diameter of the cylindrical tube 7 is slightly smaller than the inner diameter of the outer conductors 2, so that these outer conductors 2 may be easily slipped over the ends of the outer conductor portion 7, while slidably engaging the latter. The outer conductor portions 2 overlap the outer conductor portion 7 through a distance sufficient to provide a good electrical contact.

Over the remainder of the outer surface of the tube 7 a plug structure in the form of soft rubber rings 14 is located. These soft rubber rings 14 are arranged in side by side relation in engagement with each other, and the two outermost rings 14 engage the ends of elements 23, 4, 21, and 2, as shown in Fig. 1, so that these latter elements limit axial expansion of the rings 14. The lead sheath 5 which surrounds the entire cable is located directly against the rings 14. In the region of the joint 6, a steel wire 15 is wound about the lead sheath, and it is preferred to provide between wire 15 and sheath 5 a copper sheet 16 which is bent backwardly about the ends of the wire 15 in the manner indicated at the upper portion of Fig. 1 to provide a means for fixing the ends of the wire 15 to the sheet 16. The wire 15 is wound about the lead sheath with a force great enough to press the lead sheath inwardly and compress the rings 14 against the outer conductor portion 7 and the lead sheath 5, and here again the compression of the rings 14 is such that spaces 17 (Fig. 2) between the rings 14 are not completely closed.

These spaces 12, 13, and 17 suffice to increase the compressibility of elements 9 and 14 to an extent sufficient to eliminate any increase in the pressure of elements 9 and 14 against the tubes 7 and 5 when the temperature increases.

At the ends of the plug arrangement, that is, at the opposite ends of the compressing means 8, 10, and 11, a plurality of spacers 18 are located about the inner conductors 1 between the latter and the outer conductors 2. These spacers 18 are of a substantially rigid material which is not electrically conductive, such as, for example, polystyrol. As is evident from Fig. 4 each of the spacers 18 is composed of a pair of arcuate portions which are detachably connected together to form a complete ring. Thus, as is evident from Fig. 4, each arcuate portion extends through approximately 180° and has at its diametral face a projection and a recess, and the projection of one arcuate portion fits with a light press fit into the depression of the other arcuate portion so that these arcuate portions will remain together but may be easily assembled and disassembled by hand. The use of spacers 18 is of particular advantage since, as will be described below, in the assembly of the plug arrangements it is necessary to work in an axial distance which is longer than that of the plug arrangement itself, and when the plug arrangement is in its final position shown in Fig. 1, gaps remain into which it is difficult to place the spacer 3. However, spacers 18, because of their split construction shown in Fig. 4, are easily located in these gaps.

It will be noted that the members 11 have in engagement with the outermost rings 9, respectively, side faces which are made up of two conical portions which intersect to form an annular crest. Thus, these members 11 press into the outermost rings 9 in the manner shown in Fig. 1, and this configuration of the members 11 promotes the formation of spaces 13 which increase the compressibility of the members 9 in the manner described above.

In the embodiment of Fig. 5, all parts except members 11 are the same as those described above and are indicated with the same reference characters. Instead of only one pair of members 11, as shown in Fig. 1, the embodiment of Fig. 5 includes more than two members 111, and two of these members 111 engage the outermost rings 9, in the same way as members 11 described above, while pairs of abutting members 111 are located between the outermost members 9 and the next innermost member 9, in the manner illustrated in Fig. 5. Thus, with the embodiment of Fig. 5 the interior of the plug arrangement is divided into groups of individual plug arrangements. With this arrangement if one of the outer members 111 somehow becomes injured so as to provide a gap through which water can flow, the plug will still prevent water from flowing from one cable section to the next since there is in effect a further interior seal provided by the compressed members 9 located between the innermost pair of rings 111. The rings 111 of Fig. 5 are similar to the rings 11 in their material and shape.

In assembling the plug arrangement of the invention the free end portion of one inner conductor 1 is exposed through a distance greater than the length of the plug arrangement. Then the tube 7, with the rubber rings 9, and elements 8, 10 and 11 (or 111) therein, is placed on the free end portion of one of the inner conductors. That is, this free end portion of the inner conductor is passed through the elements 8, 10, 11, and 9. The rings 14 are then placed on the exterior of the tube 7 to form the exterior seal. At this time the free end portion of the one inner conductor 1 is joined to the free end of the next conductor portion 1 at 6, as indicated in Fig. 1. This connection may be made by soldering, for example. After this joint is completed, the cylinder 7 with all of the parts mounted thereon and therein is moved back over the joint to the position indicated in Fig. 1, and the members 8 are then turned into the tube 7 so as to compress the rings 9 against the inner and outer conductors and seal the space between these conductors in a fluid-tight manner. The outer conductors 2 are then moved on to the free end portions of the outer conductor 7 to provide a good electrical contact, as was desired above. Also, as was pointed out above, there will be gaps between the members 8 and the spacer portions 3 because of the necessity of locating the plug arrangement first completely on one inner conductor and then moving it back over the other conductor. These gaps are very conveniently filled with the polystyrol spacer rings 18, which, because of their two-part construction, can be very easily placed about the inner conductor. Of course, the outer conductors 2 are moved into engagement with the outer conductor 7 after the spacer members 18 are positioned about the inner conductors 1. The lead sheath 5 is placed directly about the outer rubber rings 14, and the two outermost rings 14 bear against the layers 23, 22, 21, and 4, as was described above. Finally, elements 15 and 16 are applied to compress the rings 14 to the condition shown in Fig. 1.

It will be understood that each of the elements described above, or two or more together, may also find a useful application in other types of coaxial cables differing from the types described above.

While the invention has been illustrated and described as embodied in plug arrangements for coaxial cables, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fluid-tight plug arrangement for coaxial cables, comprising, in combination, an inner elongated conductor portion; an outer tubular, conductor portion surrounding and spaced from said inner conductor portion and being substantially coaxial therewith; a plurality of soft rubber rings through which said inner conductor portion extends, said rings being arranged in side by side relation in the space between said inner and outer conductor portions; a pair of substantially rigid rings through which said inner conductor portion also extends, said rigid rings respectively having at least partly conical side faces respectively engaging the two outermost rubber rings of said plurality of rubber rings at an annular portion thereof spaced from said conductor portion, said rubber rings defining air-containing spaces intermediate said rubber rings and said inner and outer conductor portions and intermediate said rubber rings and said conical faces of said rigid rings; and means threadedly engaging the inner surface of said outer conductor portion and respectively engaging said rigid rings, urging the same toward each other, and compressing said rubber rings into engagement with said inner and outer conductor portions while leaving the air in said intermediate spaces in condition to be compressed upon thermal expansion of said rubber rings into said intermediate spaces.

2. A fluid-tight plug arrangement for coaxial cables, comprising, in combination, an inner, elongated conductor portion; an outer, tubular, conductor portion surrounding and spaced from said inner conductor portion and being substantially coaxial therewith; a plurality of plastic, deformable plug members arranged about said inner conductor portion in the space between the same and said outer conductor portion; compressing means compressing said plug members and urging the same against said conductor portions, said space between said conductor portions being only partially filled by said plug members; a substance of greater compressibility than said plug members filling the portion of said space which is not occupied by said plug members, so that said substance decreases in volume when said plug members increase in volume; a plurality of compressed soft rubber rings arranged in side by side relation about said outer conductor portion at the exterior thereof; a lead sheath portion surrounding said rubber rings, said rubber rings defining air-containing spaces intermediate said outer conductor portion and said lead sheath portion; and pressing means pressing said lead sheath portion toward said rubber rings whereby upon increased temperature in said plug arrangement said compressed plug members expand into the space containing said substance of greater compressibility and said compressed rubber rings expand into said air-containing spaces so that damage to the lead sheath is prevented.

3. A fluid-tight plug arrangement for coaxial cables, comprising, in combination, an inner, elongated conductor portion; an outer, tubular, conductor portion surrounding and spaced from said inner conductor portion and being substantially coaxial therewith; a plurality of plastic, deformable plug members arranged about said inner conductor portion in the space between the same and said outer conductor portion; compressing means compressing said plug members and urging the same against said conductor portions, said space between said conductor portions being only partially filled by said plug members; a substance of greater compressibility than said plug members filling the portion of said space which is not occupied by said plug members, so that said substance decreases in volume when said plug members increase in volume; a plurality of compressed soft rubber rings arranged in side by side relation about said outer conductor portion at the exterior thereof, said rubber rings each having a radial cross section whose width diminishes as it approaches the periphery of said rubber ring; a lead sheath portion surrounding said rubber rings, said rubber rings defining air-containing spaces intermediate said outer conductor portion and said lead sheath portion; and pressing means pressing said lead sheath portion inwardly toward said rubber rings to compress the latter whereby upon increased temperature in said plug arrangement said compressed plug members expand into the space containing said substance of greater compressibility and said compressed rubber rings expand into said air-containing spaces so that damage to the lead sheath is prevented.

4. A fluid-tight plug arrangement for coaxial cables, comprising, in combination, an inner, elongated conductor portion; an outer, tubular, conductor portion surrounding and spaced from said inner conductor portion and being substantially coaxial therewith; a plurality of plastic, deformable plug members arranged about said inner conductor portion in the space between the same and said outer conductor portion; compressing means compressing said plug members and urging the same against said conductor portions, said space between said conductor portions being only partially filled by said plug members; a substance of greater compressibility than said plug members filling the portion of said space which is not occupied by said plug members, so that said substance decreases in volume when said plug members increase in volume; a plurality of compressed soft rubber rings arranged in side by side relation about said outer conductor portion at the exterior thereof; a lead sheath portion surrounding said rubber rings, said rubber rings defining air-containing spaces intermediate said outer conductor portion and said leath sheath portion; and pressing means pressing said lead sheath portion inwardly toward said rubber rings, said pressing means including an elongated member wound about said sheath portion at the exterior thereof whereby upon increased temperature in said plug arrangement said compressed plug members expand into the space containing said substance of greater compressibility and said compressed rubber rings expand into said air-containing spaces so that damage to the lead sheath is prevented.

5. A fluid-tight plug arrangement for coaxial cables, comprising, in combination, an inner, elongated conductor portion; an outer tubular, conductor portion surrounding and spaced from said inner conductor portion and being substantially coaxial therewith; a plurality of plastic, deformable plug members arranged about said inner conductor portion in the space between the same and said outer conductor portion; compressing means compressing said plug members and urging the same against said conductor portions, said space between said conductor portions being only partially filled by said plug members; a substance of greater compressibility than said plug members filling the portion of said space which is not occupied by said plug members, so that said substance decreases in volume when said plug members increase in volume; a plurality of compressed soft rubber rings arranged in side by side relation about said outer conductor portion at the exterior thereof; a lead sheath portion surrounding said rubber rings, said rubber rings defining air-containing spaces intermediate said outer conductor portion and said lead sheath portion; and pressing means pressing said lead sheath portion inwardly toward said rubber rings to compress the latter, said pressing means including a steel wire wound about said sheath portion at the exterior thereof, whereby upon increased temperature in said plug arrangement said compressed plug members expand into the space containing said substance of greater compressibility and said compressed rubber rings expand into said air-containing spaces so that damage to the lead sheath is prevented.

References Cited in the file of this patent

UNITED STATES PATENTS

| 635,960 | Grush | Oct. 31, 1899 |
| 1,541,756 | Williams | June 9, 1925 |
| 1,851,939 | Williams | Mar. 29, 1932 |
| 2,253,987 | Shanklin | Aug. 26, 1941 |
| 2,256,897 | Davidson et al. | Sept. 23, 1941 |
| 2,437,482 | Salisbury | Mar. 9, 1948 |
| 2,790,023 | Keller | Apr. 23, 1957 |

FOREIGN PATENTS

| 879,562 | Germany | June 15, 1953 |